United States Patent
Lee et al.

(10) Patent No.: US 9,133,746 B2
(45) Date of Patent: Sep. 15, 2015

(54) METHOD FOR PREDICTING NOX LOADING AT DENOX CATALYST AND EXHAUST SYSTEM USING THE SAME

(75) Inventors: Jin Ha Lee, Seoul (KR); Jin Woo Park, Suwon (KR); Christopher Severin, Aachen (DE); Thomas Wittka, Aachen (DE)

(73) Assignees: HYUNDAI MOTOR COMPANY, Seoul (KR); KIA MOTORS CORPORATION, Seoul (KR); FEV MOTORENTECHNIK GMBH, Aachen (DE)

( * ) Notice: Subject to any disclaimer, the term of this patent is extended or adjusted under 35 U.S.C. 154(b) by 615 days.

(21) Appl. No.: 13/232,349

(22) Filed: Sep. 14, 2011

(65) Prior Publication Data
US 2012/0137663 A1    Jun. 7, 2012

(30) Foreign Application Priority Data

Dec. 2, 2010 (KR) .................. 10-2010-0122235

(51) Int. Cl.
*F01N 3/00* (2006.01)
*F01N 3/08* (2006.01)
*F01N 3/025* (2006.01)
*F01N 11/00* (2006.01)

(52) U.S. Cl.
CPC ............. *F01N 3/0814* (2013.01); *F01N 3/025* (2013.01); *F01N 3/0842* (2013.01); *F01N 3/0871* (2013.01); *F01N 11/00* (2013.01); *F01N 2240/30* (2013.01); *F01N 2250/12* (2013.01); *F01N 2550/03* (2013.01); *F01N 2560/025* (2013.01); *F01N 2610/03* (2013.01); *F01N 2900/1402* (2013.01); *F01N 2900/1404* (2013.01); *F01N 2900/1411* (2013.01); *F01N 2900/1614* (2013.01); *F01N 2900/1621* (2013.01); *Y02T 10/47* (2013.01)

(58) Field of Classification Search
USPC .................................................. 60/274–303
See application file for complete search history.

(56) References Cited

U.S. PATENT DOCUMENTS

| 6,829,885 B2 * | 12/2004 | Surnilla et al. .................. 60/274 |
| 2003/0097833 A1 | 5/2003 | Ingram et al. |
| 2004/0031261 A1 * | 2/2004 | Sun et al. ........................ 60/277 |

(Continued)

FOREIGN PATENT DOCUMENTS

| CN | 1614203 A | 5/2005 |
| CN | 1982663 A | 6/2007 |

(Continued)

*Primary Examiner* — Thomas Denion
*Assistant Examiner* — Kelsey Stanek
(74) *Attorney, Agent, or Firm* — Morgan, Lewis & Bockius LLP

(57) ABSTRACT

A method is provided for predicting NOx loading at a DeNOx catalyst by which a NOx amount actually stored in the DeNOx catalyst can be precisely predicted and to an exhaust system which controls a regeneration timing of the DeNOx catalyst and amount of a reducing agent which is injected by using the method. The method may include calculating mass flow of NOx stored at the DeNOx catalyst, calculating mass flow of NOx thermally released from the DeNOx catalyst, calculating mass flow of NOx chemically released from the DeNOx catalyst, and calculating NOx amount actually stored at the DeNOx catalyst by using the mass flow of NOx stored at the DeNOx catalyst, the mass flow of NOx thermally released from the DeNOx catalyst, and the mass flow of NOx chemically released from the DeNOx catalyst.

18 Claims, 6 Drawing Sheets

(56) References Cited

U.S. PATENT DOCUMENTS

| | | |
|---|---|---|
| 2004/0244361 A1 | 12/2004 | Tanabe et al. |
| 2005/0251318 A1 | 11/2005 | Wickert et al. |
| 2009/0000274 A1* | 1/2009 | Stroh .............................. 60/274 |
| 2009/0044516 A1 | 2/2009 | Gabe et al. |
| 2009/0044518 A1 | 2/2009 | Frouvelle et al. |
| 2009/0077951 A1 | 3/2009 | Arlt et al. |
| 2009/0165758 A1* | 7/2009 | Nishiumi et al. ........ 123/568.21 |
| 2009/0185954 A1 | 7/2009 | Qi et al. |
| 2011/0099976 A1* | 5/2011 | Park ................................ 60/274 |

FOREIGN PATENT DOCUMENTS

| | | |
|---|---|---|
| CN | 101333954 A | 12/2008 |
| DE | 102 40 977 A1 | 3/2004 |
| EP | 0 962 639 A1 | 12/1999 |
| EP | 1 471 219 A1 | 10/2004 |
| EP | 1 857 647 A1 | 11/2007 |
| JP | 6-129239 A | 5/1994 |
| JP | 10-280987 A | 10/1998 |
| JP | 2000-161107 A | 6/2000 |
| JP | 2000-282848 A | 10/2000 |
| JP | 2001-221034 A | 8/2001 |
| JP | 2002-364345 A | 12/2002 |
| JP | 2003-269144 A | 9/2003 |
| JP | 2003-314328 A | 11/2003 |
| JP | 2004-506830 A | 3/2004 |
| JP | 2004-211676 A | 7/2004 |
| JP | 2004-324566 A | 11/2004 |
| JP | 2005-90460 A | 4/2005 |
| JP | 2005-240682 A | 9/2005 |
| JP | 2006-37768 A | 2/2006 |
| JP | 2006-226219 A | 8/2006 |
| JP | 2006-283611 A | 10/2006 |
| JP | 2006-299896 A | 11/2006 |
| JP | 3903977 B2 | 1/2007 |
| JP | 4089690 B2 | 3/2008 |
| JP | 2008-267213 A | 11/2008 |
| JP | 2008-274763 A | 11/2008 |
| JP | 2009-47086 A | 3/2009 |
| JP | 2009-156168 A | 7/2009 |
| JP | 2009-209898 A | 9/2009 |
| JP | 2009-221873 A | 10/2009 |
| JP | 2009-257243 A | 11/2009 |
| JP | 2009-299572 A | 12/2009 |
| JP | 2010-242688 A | 10/2010 |
| KR | 10-0592414 B1 | 6/2006 |
| KR | 10-2007-0062207 A | 6/2007 |
| WO | WO 2010/079619 A1 | 7/2010 |

* cited by examiner

METHOD FOR PREDICTING NOX LOADING AT DENOX CATALYST AND EXHAUST SYSTEM USING THE SAME

CROSS-REFERENCE TO RELATED APPLICATION

This application claims priority to and the benefit of Korean Patent Application No. 10-2010-0122235 filed Dec. 2, 2010, the entire contents of which application is incorporated herein for all purposes by this reference.

BACKGROUND OF INVENTION

1. Field of Invention

The present invention relates to a method for predicting NOx loading at a DeNOx catalyst and an exhaust system using the same. More particularly, the present invention relates to a method for predicting NOx loading at a DeNOx catalyst by which a NOx amount actually stored in the DeNOx catalyst can be precisely predicted and to an exhaust system which controls a regeneration timing of the DeNOx catalyst and amount of a reducing agent which is injected by using the method.

2. Description of Related Art

Generally, exhaust gas flowing out through an exhaust manifold from an engine is driven into a catalytic converter mounted at an exhaust pipe and is purified therein. After that, the noise of the exhaust gas is decreased while passing through a muffler and then the exhaust gas is emitted into the air through a tail pipe. The catalytic converter purifies pollutants contained in the exhaust gas. In addition, a particulate filter for trapping particulate matters (PM) contained in the exhaust gas is mounted in the exhaust pipe.

A denitrification catalyst (DeNOx catalyst) is one type of such a catalytic converter and purifies nitrogen oxide (NOx) contained in the exhaust gas. If reducing agents such as urea, ammonia, carbon monoxide, and hydrocarbon (HC) are supplied to the exhaust gas, the NOx contained in the exhaust gas is reduced in the DeNOx catalyst through oxidation-reduction reaction with the reducing agents.

Recently, a lean NOx trap (LNT) catalyst is used as such a DeNOx catalyst. The LNT catalyst absorbs the NOx contained in the exhaust gas when the engine operates in a lean atmosphere, and releases the absorbed NOx when the engine operates in a rich atmosphere. The release of the absorbed NOx from the LNT catalyst is called regeneration.

According to a conventional method for regenerating the LNT catalyst, the NOx amount contained in the exhaust gas is predicted based on a driving condition of the engine, the NOx amount stored in the LNT catalyst is predicted from the NOx amount contained in the exhaust gas, and the reducing agents is injected or combustion atmosphere is controlled when the NOx amount stored in the LNT catalyst is larger than or equal to a predetermined amount. In order to perform the conventional method for regenerating the LNT catalyst successfully, the NOx amount stored in the LNT catalyst should be predicted precisely. In addition, in order to predict the NOx amount stored in the LNT catalyst precisely, the NOx amount contained in the exhaust gas should be predicted precisely. A method for precisely predicting the NOx amount contained in the exhaust gas is disclosed in Korean patent application Nos. 10-2010-0115239 and 10-2010-0115238, and a method for precisely predicting NOx amount and NO2 amount remaining at the DeNOx catalyst after previous regeneration is disclosed in Korean patent application No. 10-2010-0121836.

Therefore, a method for precisely predicting the NOx amount stored in the DeNOx catalyst will hereinafter be disclosed in this specification.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method for predicting NOx loading at a DeNOx catalyst having advantages of precisely predicting the NOx amount actually stored in the DeNOx catalyst considering of catalyst aging and catalyst temperature of the DeNOx catalyst.

Various aspects of the present invention provide for an exhaust system having advantages of precisely predicting regeneration timing of the DeNOx catalyst and injection amount of reducing agents based on the predicted NOx storage amount.

A method for predicting NOx loading at a DeNOx catalyst according to various aspects of the present invention may include calculating mass flow of NOx stored at the DeNOx catalyst, calculating mass flow of NOx thermally released from the DeNOx catalyst, calculating mass flow of NOx chemically released from the DeNOx catalyst, and calculating NOx amount actually stored at the DeNOx catalyst by using the mass flow of NOx stored at the DeNOx catalyst, the mass flow of NOx thermally released from the DeNOx catalyst, and the mass flow of NOx chemically released from the DeNOx catalyst.

Calculation of the mass flow of NOx stored at the DeNOx catalyst may include calculating NOx storage capacity per volume according to catalyst temperature, calculating actual NOx storage capacity by using the NOx storage capacity per volume and effective volume of the DeNOx catalyst, calculating relative NOx storage level by using the actual NOx storage capacity and actual NOx storage amount, calculating reference NOx storage efficiency by using the relative NOx storage level and the catalyst temperature, correcting the reference NOx storage efficiency, and calculating the mass flow of NOx stored at the DeNOx catalyst by using the corrected NOx storage efficiency and mass flow of NOx in exhaust gas.

The reference NOx storage efficiency may be primarily corrected based on volume speed of the exhaust gas and may be secondarily corrected based on actual NO2/NOx ratio.

Primary correction of the reference NOx storage efficiency based on the volume speed of the exhaust gas may include calculating a first correction coefficient based on the volume speed of the exhaust gas and catalyst aging, and multiplying the reference NOx storage efficiency and the first correction coefficient.

The catalyst aging may include thermal degradation and aging caused by sulfur poisoning.

Secondary correction of the reference NOx storage efficiency based on the actual NO2/NOx ratio may include calculating a second correction coefficient based on the actual NO2/NOx ratio, and multiplying the primarily corrected reference NOx storage efficiency and the second correction coefficient.

Calculation of the mass flow of NOx thermally released from the DeNOx catalyst may include calculating catalyst temperature at which current NOx storage amount is maximum NOx storage amount, determining whether current catalyst temperature is lower than or equal to the catalyst temperature at which the current NOx storage amount is the maximum NOx storage amount, and subtracting, in a case that the current catalyst temperature is higher than the catalyst temperature at which the current NOx storage amount is the maximum NOx storage amount, maximum NOx storage amount at the current catalyst temperature from the current NOx storage amount.

The NOx may not be thermally released from the DeNOx catalyst in a case that the current catalyst temperature is lower than or equal to the catalyst temperature at which the current NOx storage amount is the maximum NOx storage amount.

An exhaust system according to other aspects of the present invention may include an exhaust pipe through which an exhaust gas flows, the exhaust gas being generated at an engine having a first injector injecting a fuel into a combustion chamber, a second injector mounted at the exhaust pipe and injecting a reducing agent, a DeNOx catalyst mounted at the exhaust pipe downstream of the second injector and reducing NOx contained in the exhaust gas by using the reducing agent injected by the second injector, and a control portion predicting NOx amount stored at the DeNOx catalyst according to a driving condition of the engine, wherein the control portion calculates mass flow of NOx stored at the DeNOx catalyst, mass flow of NOx thermally released from the DeNOx catalyst, and mass flow of NOx chemically released from the DeNOx catalyst, and predicts the NOx amount stored in the DeNOx catalyst by subtracting the mass flow of NOx thermally released from the DeNOx catalyst and the mass flow of NOx chemically released from the DeNOx catalyst from the mass flow of NOx stored at the DeNOx catalyst.

The control portion may calculate NOx storage capacity by using NOx storage capacity per volume according to catalyst temperature and effective volume of the DeNOx catalyst, relative NOx storage level by using the NOx storage capacity and actual NOx storage amount, reference NOx storage efficiency by using the relative NOx storage level and the catalyst temperature, and the mass flow of NOx stored at the DeNOx catalyst by using the reference NOx storage efficiency and mass flow of NOx in the exhaust gas.

The reference NOx storage efficiency may be primarily corrected based on volume speed of the exhaust gas and catalyst aging.

The reference NOx storage efficiency may be secondarily corrected based on actual NO2/NOx ratio.

The catalyst aging may include thermal degradation and aging caused by sulfur poisoning.

The control portion may calculate NOx amount which can be maximumly stored at current catalyst temperature and the mass flow of NOx thermally released from the DeNOx catalyst by subtracting the NOx amount which can be maximumly stored at the current catalyst temperature from current NOx storage amount.

The mass flow of NOx thermally released from the DeNOx catalyst, in a case that a value obtained by subtracting the NOx amount which can be maximumly stored at the current catalyst temperature from the current NOx storage amount is positive, may be calculated by dividing the value by a predetermined time.

The mass flow of NOx thermally released from the DeNOx catalyst, in a case that a value obtained by subtracting the NOx amount which can be maximumly stored at the current catalyst temperature from the current NOx storage amount is negative, may be zero.

The reducing agent may be fuel.

In this case, the exhaust system may further include a fuel cracking catalyst disposed at the exhaust pipe between the second injector and the DeNOx catalyst and decomposing the fuel.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
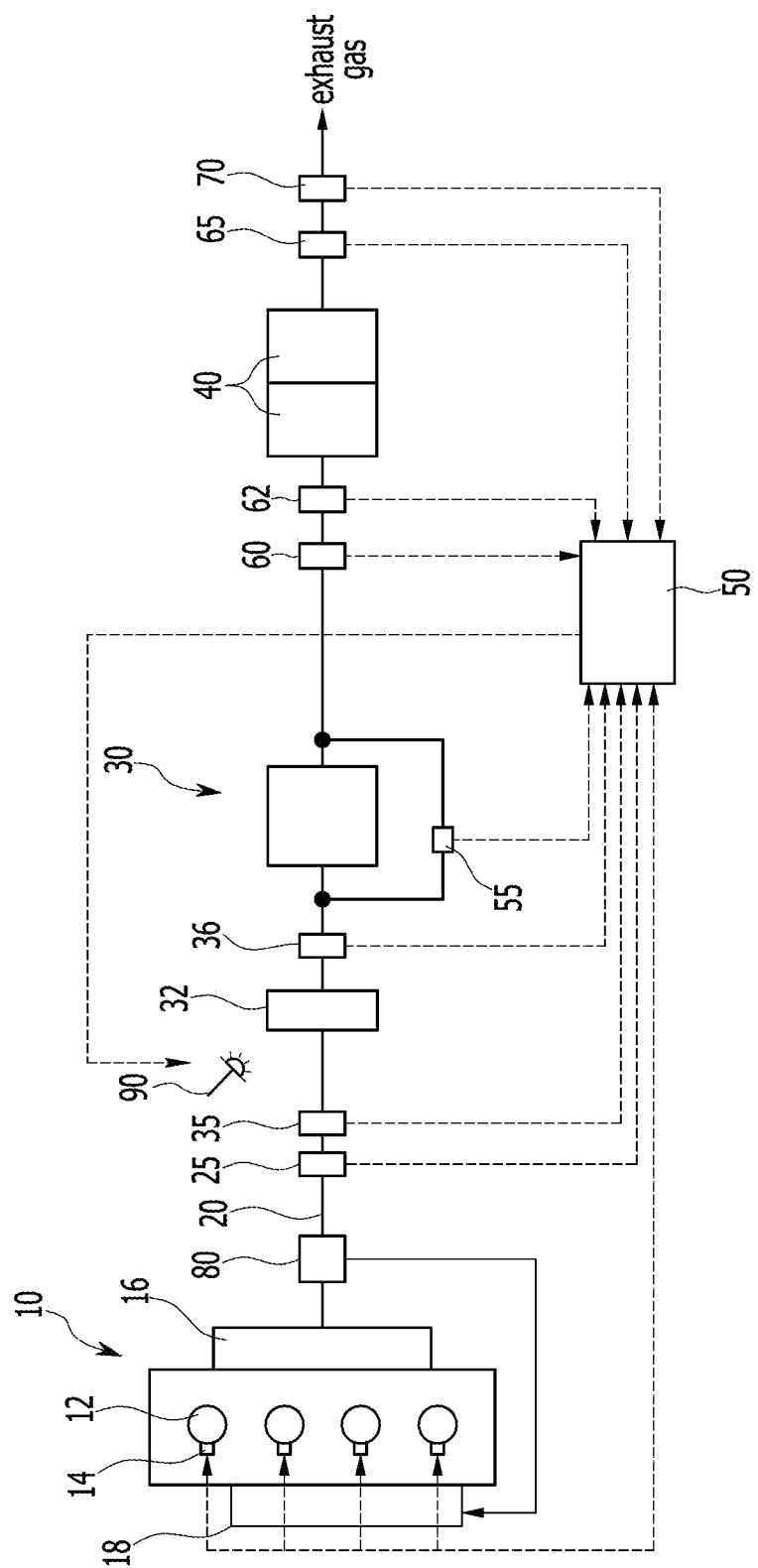
FIG. 1 is a schematic diagram of an exemplary exhaust system to which a method for predicting NOx loading at a DeNOx catalyst according to the present invention can be applied.

As shown in FIG. 1, an exhaust system for an internal combustion engine includes an engine 10, an exhaust pipe 20, an exhaust gas recirculation (EGR) apparatus 80, a fuel cracking catalyst 32, a particulate filter 30, a DeNox catalyst 40, and a control portion 50.

The engine 10 burns an air-fuel mixture in which fuel and air are mixed so as to convert chemical energy into mechanical energy. The engine 10 is connected to an intake manifold 18 so as to receive the air in a combustion chamber 12, and is connected to an exhaust manifold 16 such that exhaust gas generated in a combustion process is gathered in the exhaust manifold 16 and is exhausted to the exterior. A first injector 14 is mounted in the combustion chamber 12 so as to inject the fuel into the combustion chamber 12.

A diesel engine is exemplified herein, but a lean-burn gasoline engine may be used. In a case that the gasoline engine is used, the air-fuel mixture flows into the combustion chamber 12 through the intake manifold 18, and a spark plug is mounted at an upper portion of the combustion chamber 12.

In addition, an engine having various compression ratios, for example, a compression ration lower than or equal to 16.5, may be used.

The exhaust pipe 20 is connected to the exhaust manifold 16 so as to exhaust the exhaust gas to the exterior of a vehicle. The particulate filter 30 and the DeNOx catalyst 40 are mounted at the exhaust pipe 20 so as to remove HC, CO, PM, and NOx contained in the exhaust gas.

The exhaust gas recirculation apparatus 80 is mounted at the exhaust pipe 20, and the exhaust gas exhausted from the engine 10 passes through the exhaust gas recirculation apparatus 80. In addition, the exhaust gas recirculation apparatus 80 is connected to the intake manifold 18 so as to control the combustion temperature by mixing a portion of the exhaust gas with the air. Such control of the combustion temperature is performed by controlling an amount of the exhaust gas supplied to the intake manifold 18 by control of the control portion 50.

A first oxygen sensor 25 is mounted at the exhaust pipe 20 downstream of the exhaust gas recirculation apparatus 80, and detects oxygen amount in the exhaust gas passing through the exhaust gas recirculation apparatus 80. In this specification, the detected value by the first oxygen sensor is called a lambda of an engine outlet.

The second injector 90 is mounted at the exhaust pipe 20 downstream of the exhaust gas recirculation apparatus 80, is electrically connected to the control portion 50, and performs additional injection of fuel into the exhaust pipe 20 according to control of the control portion 50.

The particulate filter 30 is mounted at the exhaust pipe 20 downstream of the second injector 90. A fuel cracking catalyst is provided at upstream of the particulate filter 30. In this case, the fuel cracking catalyst 32 is disposed between the second injector 90 and the DeNOx catalyst 40. Herein, the fuel cracking catalyst 32 is provided separately from the particulate filter 30, but the fuel cracking catalyst 32 may be coated at a front portion of the particulate filter 30.

The fuel cracking catalyst 32 cuts a chain ring of carbon compounds contained in the fuel through the catalyst reaction so as to decompose the carbon compounds. That is, the fuel cracking catalyst 32 cuts the chain ring constituting hydrocarbon and decomposes the fuel through thermal cracking. Therefore, effective reaction area of the additionally injected fuel increases, and thereby hydrocarbon including high-reactivity oxygen (oxygenated HC), CO, and H2 are produced.

Thermal cracking proceeds as follows.

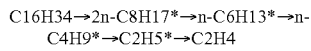

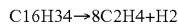

Here, * means a radical.

Herein, the hydrocarbon represents all compounds consisting of carbon and hydrogen contained in the exhaust gas and the fuel.

A particulate matter filtering device 30 which is one type of the particulate filter 30 is mounted at downstream of the fuel cracking catalyst 32, and traps particulate matters (PM) contained in the exhaust gas exhausted through the exhaust pipe 20. In this specification, the particulate matter filtering device 30 and the particulate filter 30 are used for representing the same filter. However, other types of particulate filter 30 (e.g., catalyst particulate filter (CPF)) may be used instead of using the particulate matter filtering device 30.

In addition, an oxidizing catalyst may be coated at the particulate filter 30. Such an oxidizing catalyst oxidizes HC and CO contained in the exhaust gas into CO2, and oxidizes NO contained in the exhaust gas into NO2. The oxidizing catalyst may be coated mainly at a specific region of the particulate filter 30 or may be coated uniformly at an entire region of the particulate filter 30.

A first temperature sensor 35 is mounted at the exhaust pipe 20 upstream of the fuel cracking catalyst 32, and detects an inlet temperature of the fuel cracking catalyst 32. A second temperature sensor 36 is mounted at downstream of the fuel cracking catalyst 32, and detects an outlet temperature of the fuel cracking catalyst 32 or an inlet temperature of the particulate filter 30.

Meanwhile, a pressure difference sensor 55 is mounted at the exhaust pipe 20. The pressure difference sensor 55 detects a pressure difference between an inlet and an outlet of the particulate filter 30, and transmits a signal corresponding thereto to the control portion 50. The control portion 50 controls the particulate filter 30 to be regenerated when the pressure difference detected by the pressure difference sensor 55 is higher than or equal to a first predetermined pressure. In this case, the first injector 14 can post-inject fuel so as to burn the PM trapped in the particulate filter 30. On the contrary, the second injector 90 can additionally inject the fuel so as to regenerate the particulate filter 30.

The DeNOx catalyst 40 is mounted at the exhaust pipe 20 downstream of the particulate filter 30. The DeNOx catalyst 40 absorbs the NOx contained in the exhaust gas, and releases the absorbed NOx by the additional injection of the fuel. In addition, the DeNOx catalyst 40 performs a reduction reaction of the released NOx so as to purify the NOx contained in the exhaust gas.

A third temperature sensor 60 and a fourth temperature sensor 65 are mounted respectively at upstream and downstream of the DeNOx catalyst 40 so as to detect an inlet temperature and an outlet temperature of the DeNOx catalyst 40. Herein, the DeNOx catalyst 40 is divided into two parts. Why the DeNOx catalyst 40 is divided into two parts is that metal ratio coated at each part may be changed so as to perform a specific function. For example, heat-resisting ability of a first part 40 close to the engine 10 is strengthened by increasing palladium (Pd) ratio, and slip of hydrocarbon from a second part 40 is prevented by increasing platinum (Pt) ratio. On the contrary, the DeNOx catalyst 40 in which the same metal ratio is coated at an entire region may be used.

In addition, a second oxygen sensor 62 is mounted at the exhaust pipe 20 upstream of the DeNox catalyst 40 and a third oxygen sensor 70 is mounted at the exhaust pipe 20 downstream of the DeNOx catalyst 40. The second oxygen sensor 62 detects oxygen amount contained in the exhaust gas flowing into the DeNOx catalyst 40 and transmits a signal corresponding thereto to the control portion 50 so as to help the control portion 50 perform lean/rich control of the exhaust gas. In addition, the third oxygen sensor 70 is used for monitoring whether the exhaust system for an internal combustion engine according to various embodiments of the present invention normally purifies noxious materials contained in the exhaust gas. Herein, it is exemplary described in this specification that the second oxygen sensor 62 is additionally mounted at the exhaust pipe 20. However, instead of additionally mounting the second oxygen sensor 62 at the exhaust pipe 20, the oxygen amount contained in the exhaust gas flowing into the DeNOx catalyst 40 may be estimated based on at least one of detected values of the first oxygen sensor 25 and the third oxygen sensor 70, fuel consumption, and engine operating history. In this specification, the detected value by the second oxygen sensor 62 is called a lambda of an inlet of the DeNOx catalyst.

The control portion 50 determines a driving condition of the engine based on signals transmitted from each sensor, and controls additional injection amount and additional injection timing of the fuel based on the driving condition of the engine. Thereby, the control portion 50 controls the DeNox catalyst 40 to release the absorbed NOx. For example, in a case that NOx amount absorbed in the DeNox catalyst 40 is larger than or equal to a predetermined value, the control portion 50 controls the fuel to be additionally injected.

In addition, the control portion 50 controls a ratio of the HC to the NOx in the exhaust gas to be larger than or equal to a predetermined ratio so as to activate reduction reaction of the NOx in the DeNox catalyst 40. The predetermined ratio may be 5.

Meanwhile, the control portion 50 calculates the NOx amount stored in the DeNox catalyst 40, slip amount of the NOx from a rear portion of the DeNox catalyst 40, and the ratio of the HC to the NOx based on the driving condition of the engine. Such calculation is done according to a map table defined by various experiments.

In addition, the control portion 50 changes injection pattern of the fuel injected by the second injector 90 according to the driving condition of the engine, state of the engine, or state of the DeNox catalyst 40. Here, the state of the engine is assumed by considering operating period of the engine, and the state of the DeNox catalyst 40 is assumed by considering aging of the DeNox catalyst 40.

Further, the control portion 50 performs the regeneration of the particulate filter 30.

Meanwhile, the control portion 50 may control the first injector 14 to post-inject the fuel so as to activate the reduction reaction of the NOx in the DeNox catalyst 40 instead of additional injection of the second injector 90. In this case, the post-injected fuel is converted into high-reactivity reducing agent at the fuel cracking catalyst 32, and promotes the reduction reaction of the NOx in the DeNox catalyst 40. Therefore, it is to be understood that the additional injection includes the post-injection in this specification and claim sets.

In this specification, it is exemplifies that an LNT catalyst is used as the DeNox catalyst 40, but is not limited thereto.

Hereinafter, one example of the DeNox catalyst 40 will be described in detail.

The DeNox catalyst 40 includes first and second catalyst layers coated on a carrier. The first catalyst layer is disposed close to the exhaust gas, and the second catalyst layer is disposed close to the carrier.

The first catalyst layer oxidizes the NOx contained in the exhaust gas, and reduces a portion of the oxidized NOx through oxidation-reduction reaction with the HC contained in the unburned fuel or the exhaust gas. In addition, the remaining portion of the oxidized NOx is diffused into the second catalyst layer.

The second catalyst layer absorbs the NOx diffused from the first catalyst layer, and releases the absorbed NOx by additionally injected fuel such that the absorbed NOx is reduced at the first catalyst layer. The NOx diffused to the second catalyst layer is absorbed at the second catalyst layer as a nitrate ($NO_3^-$) type. In addition, the NOx released from the second catalyst layer is changed into NO2 type and moves to the first catalyst layer. A portion of the NO2 is reduced, another portion of the NO2 slips, and the other portion of the NO2 is absorbed at the first catalyst layer.

The second catalyst layer includes an adsorption material. Weak alkaline oxides are used as such an adsorption material. Oxides containing alkali metals or alkali earth metals are used as the weak alkaline oxides, and more particularly oxides containing barium may be used as the weak alkaline oxides.

Hereinafter, operation of the DeNox catalyst 40 will be described in detail.

In a case that the fuel is not additionally injected from the second injector 90, the NOx contained in the exhaust gas is oxidized in the first catalyst layer. A portion of the oxidized NOx is reduced into N2 through the oxidation-reduction reaction with the HC contained in the exhaust gas. At this stage, the HC contained in the exhaust gas is oxidized into CO2.

In addition, the remaining portion of the oxidized NOx and the NOx contained in the exhaust gas are diffused into the second catalyst layer and are absorbed therein.

In a case that the fuel is additionally injected from the second injector 90, the additionally injected fuel passes through the fuel cracking catalyst, and the fuel is converted into the HC of the low molecule at this time. In addition, the portion of the HC of the low molecule is converted into the oxygenated HC and passes through the DeNox catalyst 40.

At this time, the NOx is released from the second catalyst layer through the substituted reaction with the HC. In addition, the NOx is reduced into the N2 and the HC and the oxygenated HC are oxidized into the CO2 in the first catalyst layer through the oxidation-reduction reaction of the released NOx with the HC and the oxygenated HC.

Therefore, the NOx and the HC contained in the exhaust gas are purified.

Figure 2:
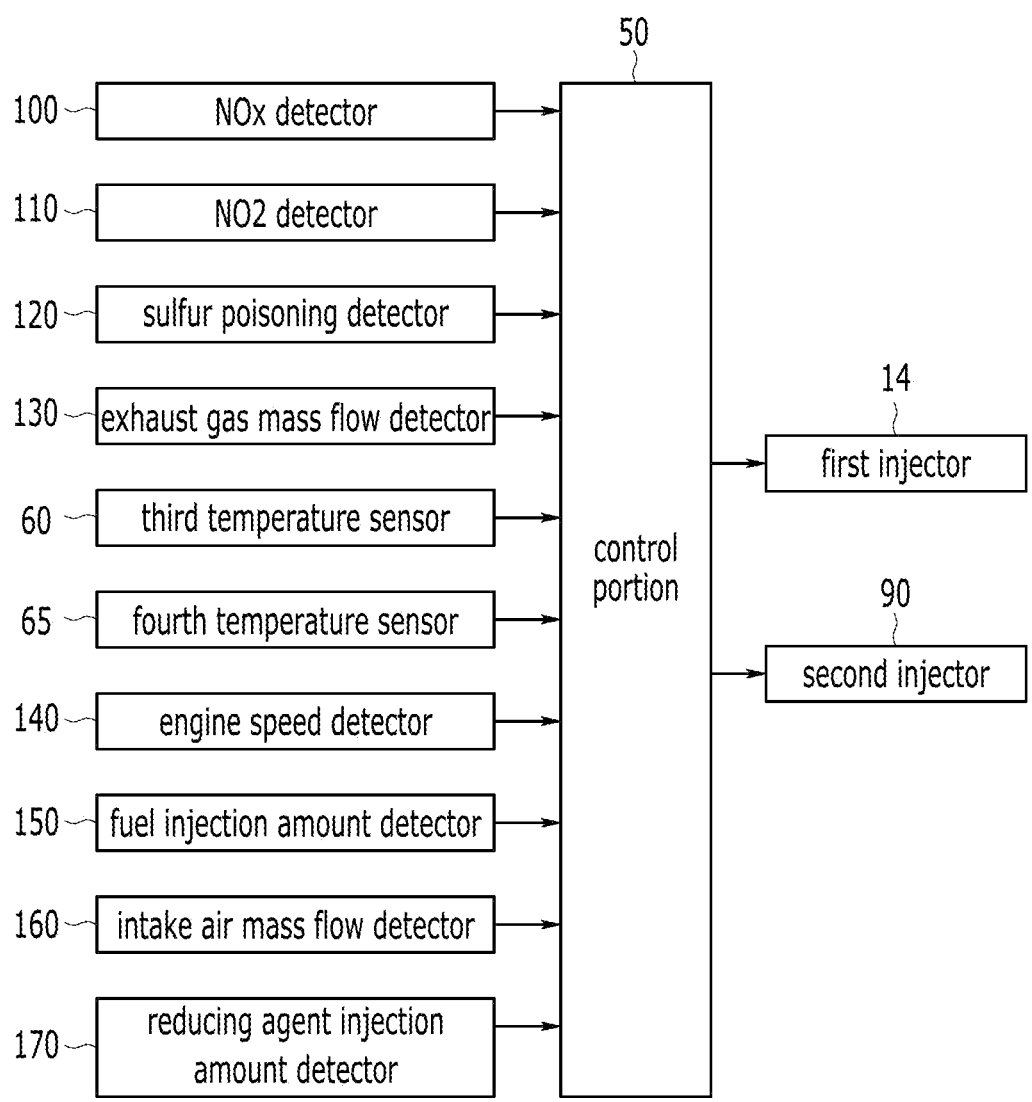
FIG. 2 is a block diagram showing a relationship of an input and output of a control portion used in an exemplary method for predicting NOx loading at a DeNOx catalyst according to the present invention.
Figure 3:
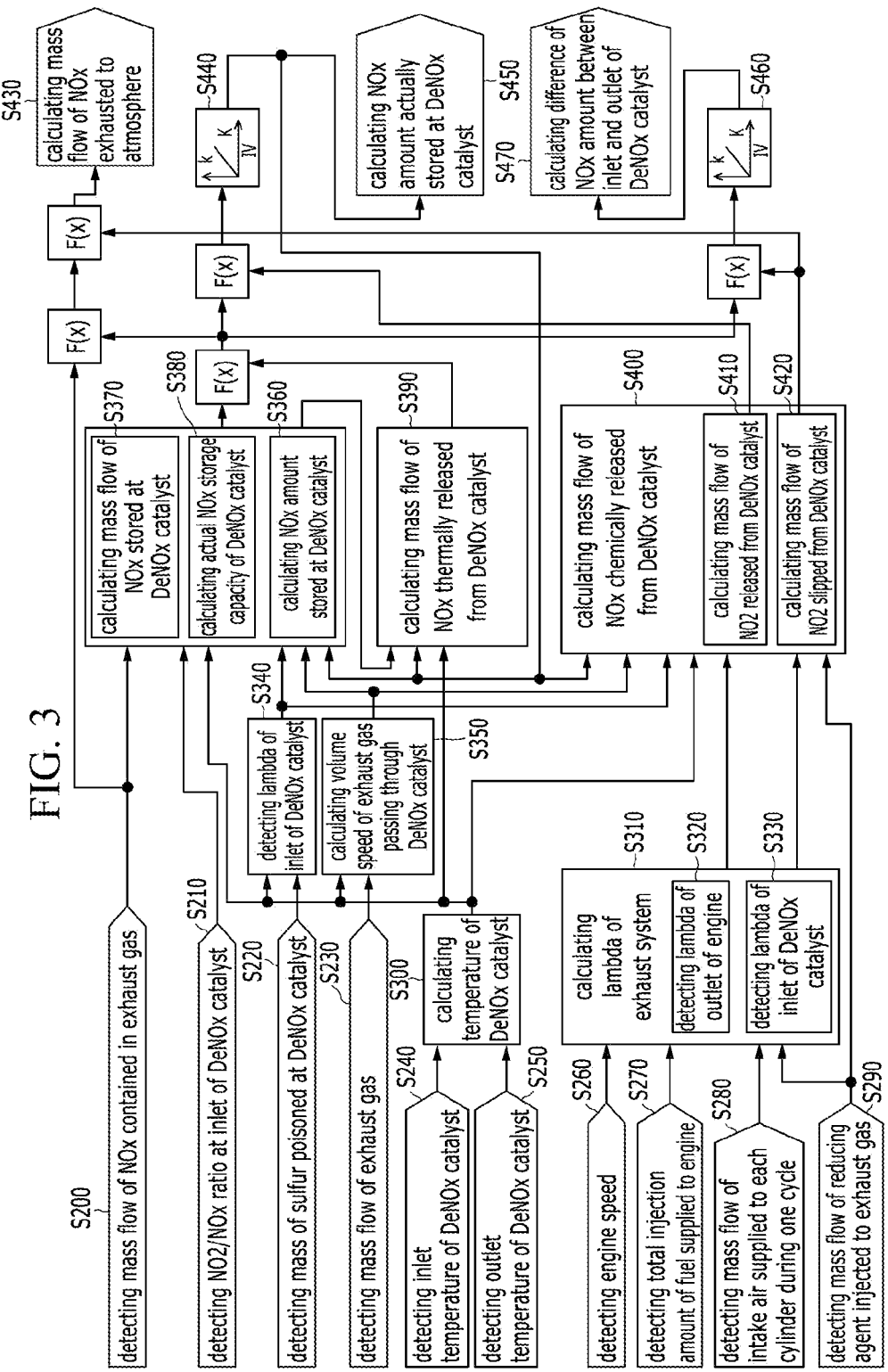
FIG. 3 is a flowchart of an exemplary method for predicting NOx loading at a DeNOx catalyst according to the present invention.

As shown in FIG. 2, an NOx detector 100, an NO2 detector 110, a sulfur poisoning detector 120, an exhaust gas mass flow detector 130, the third temperature sensor 60, the fourth temperature sensor 65, an engine speed sensor 140, a fuel injection amount detector 150, an intake air mass flow detector 160, and a reducing agent injection amount detector 170 are electrically connected to the control portion 50, and detected values thereof are transmitted to the control portion 50.

The NOx detector 100 detects the NOx amount contained in the exhaust gas passing through the inlet of the DeNOx catalyst 40. Generally, the control portion 50 predicts the NOx amount based on combustion state of the air-fuel mixture, temperature of the exhaust gas, air/fuel ratio at the outlet of the engine, and air/fuel ratio at the inlet of the DeNOx catalyst. Or, a sensor which can detects the NOx amount may be mounted at the exhaust pipe 20.

The NO2 detector 110 detects the NO2 amount contained in the exhaust gas passing through the inlet of the DeNOx catalyst 40. Generally, the control portion 50 predicts the NO2 amount based on the combustion state of the air-fuel mixture, the temperature of the exhaust gas, the air/fuel ratio at the outlet of the engine, and the air/fuel ratio at the inlet of the DeNOx catalyst. Or, a sensor which can detects the NO2 amount may be mounted at the exhaust pipe 20.

The sulfur poisoning detector 120 detects mass of sulfur poisoned at the DeNOx catalyst 40. Generally, sulfur poisoning amount according to operating time of the engine and total injected fuel amount is stored at a map, and the control portion 50 predicts the mass of the sulfur poisoned at the DeNOx catalyst 40 from the operating time of the engine and the total injected fuel amount by using the map.

The exhaust gas mass flow detector 130 detects mass flow of the exhaust gas passing through the exhaust pipe 20.

The third temperature sensor 60 detects the inlet temperature of the DeNOx catalyst 40.

The fourth temperature sensor 65 detects the outlet temperature of the DeNOx catalyst 40.

The temperatures detected by the third temperature sensor 60 and the fourth temperature sensor 65 are used to determine temperature of the DeNOx catalyst 40 through predetermined calculation. On the contrary, the inlet temperature of the DeNOx catalyst 40 or the outlet temperature of the DeNOx catalyst 40 can be used as the temperature of the DeNOx catalyst 40.

The engine speed sensor 140 detects engine speed from a phase change of a crankshaft.

The fuel injection amount detector 150 detects fuel injection amount which is currently injected. Recently, the fuel is injected by main injection and pilot injection. Therefore, the fuel injection amount detector 150 detects main injection amount and pilot injection amount supplied to the combustion chamber 12 during one cycle. In addition, because the fuel injection amount is duty-controlled by the control portion 50, the current fuel injection amount can be detected by reading a current duty value.

The intake air mass flow detector 160 is mounted at an intake pipe and detects mass flow of intake air flowing in during one cycle.

The reducing agent injection amount detector 170 detects current injection amount of the reducing agent. Because the injection amount of the reducing agent is duty-controlled by the control portion 50, the current injection amount of the reducing agent can be detected by reading a current duty value.

The control portion 50 determines the driving condition of the engine, the fuel injection amount, the fuel injection timing, the fuel injection pattern, the additional injection amount of the fuel (i.e., the injection amount of the reducing agent), the additional injection timing (i.e., regeneration timing) and the additional injection pattern based on the detected values, and outputs a signal for controlling the first and second injectors 14 and 90 to the first and second injectors 14 and 90. In addition, the control portion 50 controls the regeneration of the particulate filter 30 based on the detected value by the pressure difference sensor 55. As described above, the regeneration of the particulate filter 30 is performed by the post-injection of the first injector 14 or the additional injection of the second injector 90. Further, the control portion 50 calculates mass flow of the NOx stored at the DeNOx catalyst 40, mass flow of the NOx thermally released from the DeNOx catalyst 40, and mass flow of the NOx chemically released from the DeNOx catalyst 40, and calculates the NOx amount stored at the DeNOx catalyst 40 based thereon.

Meanwhile, the exhaust system of the internal combustion engine according to various embodiments of the present invention includes a plurality of sensors except the sensors shown in FIG. 2, but description thereof will be omitted for better comprehension and ease of description.

The NOx detector 100 detects the mass and the mass flow of the NOx contained in the exhaust gas at the inlet of the DeNOx catalyst 40 at a step S200, the NO2 detector 110 detects the NO2 amount contained in the exhaust gas at the inlet of the DeNOx catalyst 40, and the control portion 50 detects NO2/NOx ratio at the inlet of the DeNOx catalyst 40 at a step S210.

In addition, the sulfur poisoning detector 120 detects the mass of the sulfur poisoned at the DeNOx catalyst 40 at a step S220, the exhaust gas mass flow detector 130 detects the mass flow of the exhaust gas at a step S230, the third temperature sensor 60 detects the inlet temperature of the DeNOx catalyst 40 at a step S240, the fourth temperature sensor 65 detects the outlet temperature of the DeNOx catalyst 40 at a step S250, the engine speed sensor 140 detects the engine speed at a step S260, and the fuel injection amount detector 150 detects the total injection amount of the fuel supplied to the engine 10 at a step S270.

The intake air mass flow detector 160 detects the mass of the intake air during one cycle, and the control portion 50 detects the mass flow of the intake air supplied to each cylinder during one cycle based on the mass of the intake air during one cycle at a step S280.

In addition, the reducing agent injection amount detector 170 detects the mass flow of the reducing agent injected to the exhaust gas at a step S290.

The control portion 50 calculates the temperature of the DeNOx catalyst 40 based on the inlet and outlet temperatures of the DeNOx catalyst 40 at a step S300.

In addition, the control portion 50 calculates the lambda of the exhaust system at a step S310. That is, the first oxygen sensor 25 detects the lambda of the outlet of the engine at a step S320, and the second oxygen sensor 62 detects the lambda of the inlet of the DeNOx catalyst 40 at a step S330. Meanwhile, due to inaccuracy and time delay reasons of the first and second oxygen sensors 25 and 62, the lambdas of the outlet of the engine and the inlet of the DeNOx catalyst 40 may be calculated from the following equations.

$$\lambda_{ExhMnf} = \frac{m_{Air}}{m_{Fuel} \cdot L_{st}}$$

$$\lambda_{LntUs} = \frac{m_{Air}}{\left(m_{Fuel,int} + \frac{\dot{m}_{Fuel,ext} \cdot 60 \text{ s/min}}{n \cdot i \cdot z}\right) L_{st}}$$

Herein, $\lambda_{ExhMnf}$ denotes the lambda of the outlet of the engine, $m_{Air}$ denotes the mass of the fresh air, $m_{Fuel}$ and $m_{Fuel,int}$ denote the fuel amount injected to the engine, $\dot{m}_{Fuel,ext}$ denotes amount of the reducing agent, $L_{st}$ denotes a stoichiometric air/fuel ratio, n denotes the engine speed, i denotes the number of combustion cycles, and z denotes the number of the cylinders.

The control portion 50 calculates aging of the DeNOx catalyst 40 at a step S340, and calculates the volume speed of the exhaust gas passing through the DeNOx catalyst 40 at a step S350.

The aging of the DeNOx catalyst 40 includes thermal degradation and aging caused by sulfur poisoning. The thermal degradation of the DeNOx catalyst 40 proceeds quickly at high temperature, and the thermal degradation according to the operating time of the engine and the temperature of the DeNOx catalyst 40 is stored at a predetermined map. Therefore, the control portion 50 calculates the thermal degradation of the DeNOx catalyst 40 by using the predetermined map. Meanwhile, the aging caused by the sulfur poisoning, as described above, is detected by the sulfur poisoning detector 120.

The volume speed SV of the exhaust gas passing through the DeNOx catalyst is calculated by below equation.

$$SV = \frac{\dot{m}_{exh} \cdot R \cdot (T_{LNT} + 273.15)}{P \cdot V_{cat}} \cdot 1000 \frac{1}{m^3}$$

Herein, $\dot{m}_{exh}$ denotes the mass flow of the exhaust gas, R denotes ideal gas constant, $T_{LNT}$ denotes the temperature of the DeNOx catalyst 40, P denotes pressure of the exhaust gas, and $V_{cat}$ denotes volume of the catalyst.

The control portion 50 calculates the NOx amount stored at the DeNOx catalyst 40 at a step S360, and calculates the mass flow of the NOx stored at the DeNOx catalyst 40 and an actual NOx storage capacity of the DeNOx catalyst 40 based thereon respectively at steps S370 and S380.

The NOx amount stored at the DeNOx catalyst 40 is calculated from the NOx amount remaining at the DeNOx catalyst 40 after previous regeneration and the NOx amount stored at the DeNOx catalyst 40 after the previous regeneration.

Processes for calculating the mass flow stored at the DeNOx catalyst 40 and the actual NOx storage capacity of the DeNOx catalyst 40 will be described in detail with reference to FIG. 4.

Figure 4:
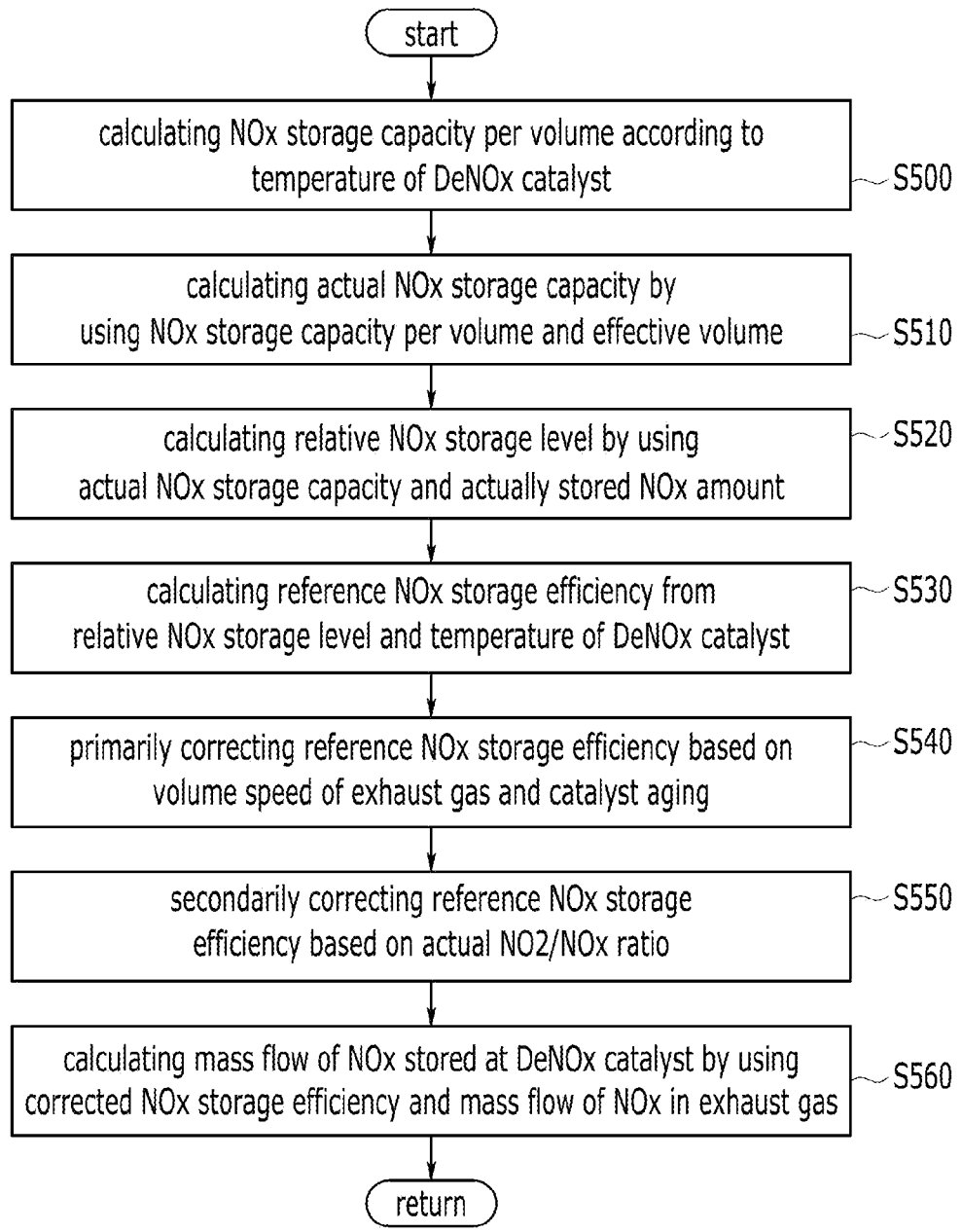
FIG. 4 is an exemplary flowchart of calculating mass flow of NOx stored at a DeNOx catalyst according to the present invention.

As shown in FIG. 4, the control portion 50 calculates NOx storage capacity per volume according to the temperature of the DeNOx catalyst 40 at a step S500. The NOx storage capacity per volume according to the temperature of the DeNOx catalyst 40 is stored at a predetermined map.

The control portion 50 calculates the actual NOx storage capacity by using the NOx storage capacity per volume and an effective volume at a step S510.

After that, the control portion 50 calculates a relative NOx storage level by using the actual NOx storage capacity and actually stored NOx amount at a step S520. The relative NOx storage level is calculated by dividing the actually stored NOx amount by the actual NOx storage capacity.

The control portion 50 calculates a reference NOx storage efficiency from the relative NOx storage level and the temperature of the DeNOx catalyst 40 at a step S530. The reference NOx storage efficiency according to the relative NOx storage level and the temperature of the DeNOx catalyst 40 is stored at a predetermined map.

After that, the control portion 50 primarily corrects the reference NOx storage efficiency based on the volume speed of the exhaust gas and the catalyst aging at a step S540. That is, the control portion 50 calculates a first correction coefficient based on the volume speed of the exhaust gas and the catalyst aging, and primarily corrects the reference NOx storage efficiency by multiplying the reference NOx storage efficiency and the first correction coefficient.

After that, the control portion 50 secondarily corrects the reference NOx storage efficiency based on an actual NO2/NOx ratio at a step S550. That is, the control portion 50 calculates a second correction coefficient based on the actual NO2/NOx ratio, and secondarily corrects the reference NOx storage efficiency by multiplying the primarily corrected reference NOx storage efficiency and the second correction coefficient.

After that, the control portion 50 calculates the mass flow of the NOx stored at the DeNOx catalyst 40 by using the corrected NOx storage efficiency and the mass flow of the NOx in the exhaust gas at a step S560. That is, the mass flow of the NOx stored at the DeNOx catalyst 40 is calculated by multiplying the corrected NOx storage efficiency and the mass flow of the NOx in the exhaust gas.

After that, the control portion 50 calculates the mass flow of the NOx thermally released from the DeNOx catalyst 40 at a step S390. Processes for calculating the mass flow of the NOx thermally released from the DeNOx catalyst 40 will be described in detail with reference to FIG. 5.

Figure 5:
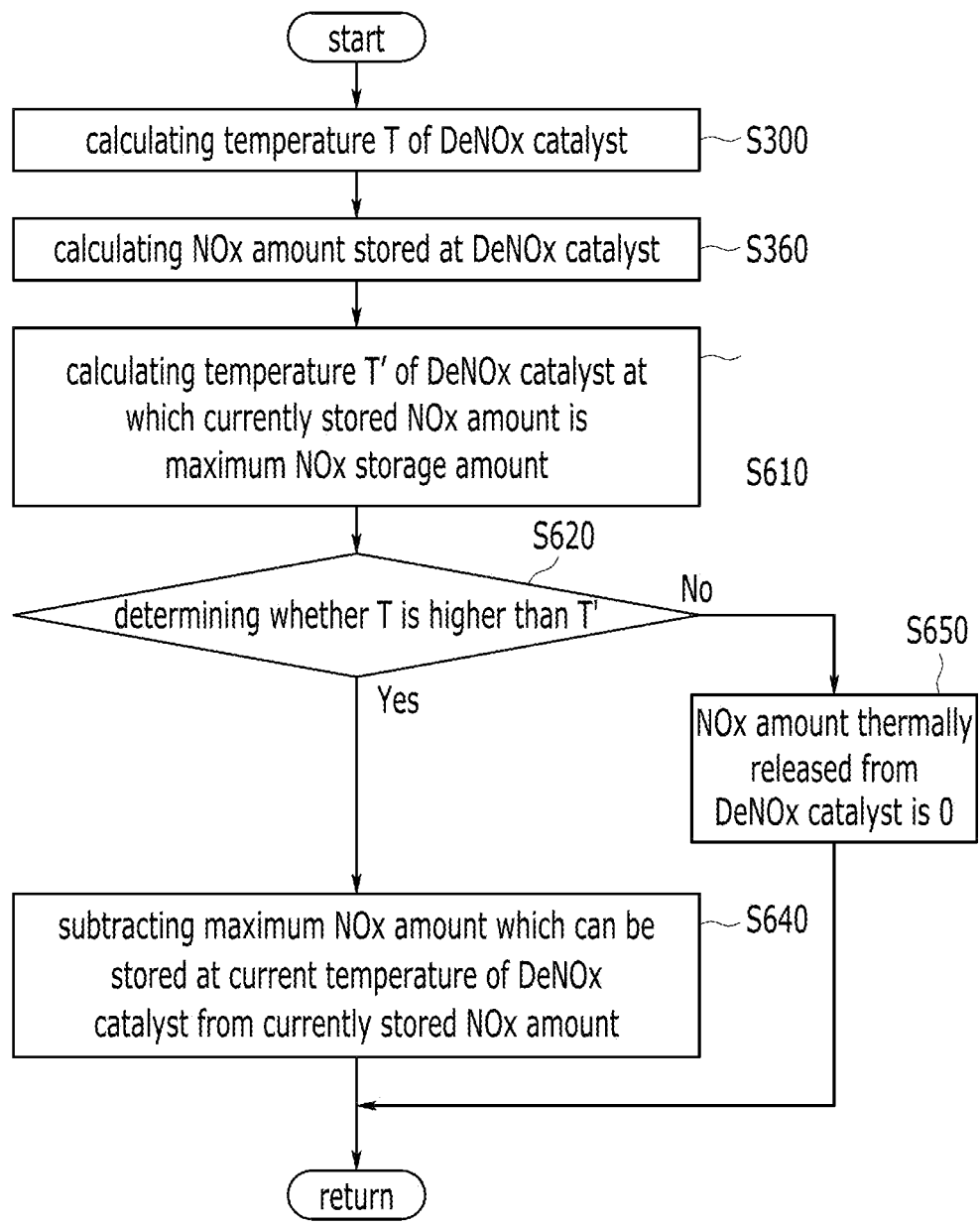
FIG. 5 is an exemplary flowchart of calculating mass flow of NOx thermally released from the DeNOx catalyst according to the present invention.

As shown in FIG. 5, the control portion 50 calculates the temperature T of the DeNOx catalyst 40 at the step S300, and calculates the NOx amount stored at the DeNOx catalyst 40 at the step S360.

Figure 6:
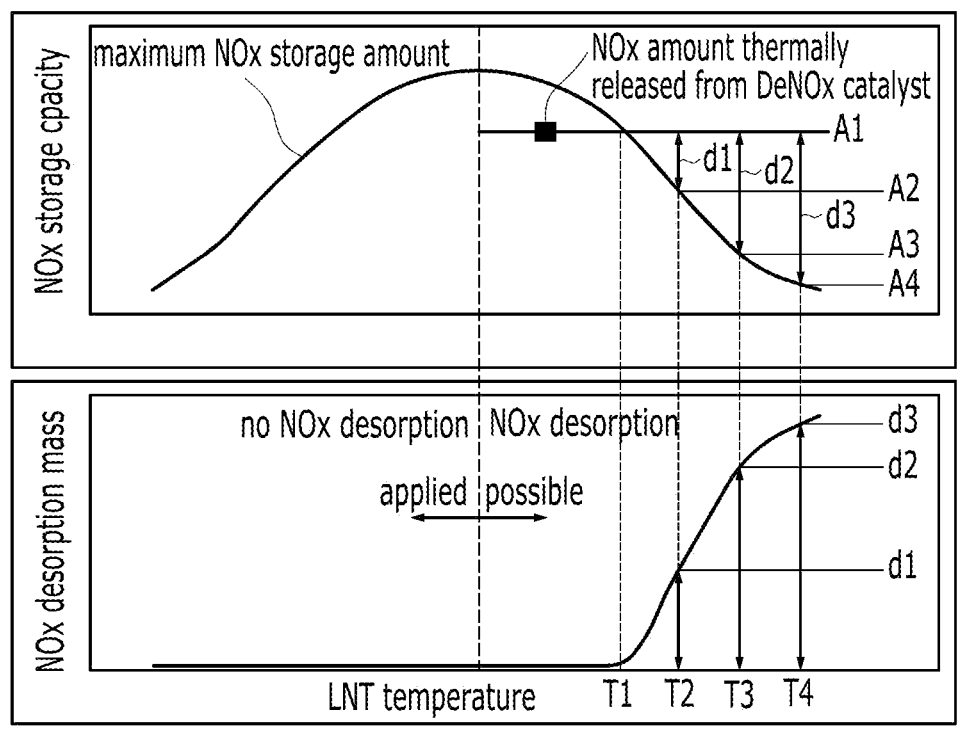
FIG. 6 is a graph showing NOx amount stored at a DeNOx catalyst according to a temperature.

After that, the control portion 50 calculates temperature T' of the DeNOx catalyst 40 at which the currently stored NOx amount is a maximum NOx storage amount at a step S610. FIG. 6 is a graph showing NOx amount stored at a DeNOx catalyst according to a temperature. Referring to FIG. 6, if the NOx amount currently stored at the DeNOx catalyst 40 is A1, the temperature T' of the DeNOx catalyst 40 at which A1 is the maximum NOx storage amount is T1.

After that, the control portion 50 determines whether T is higher than T' at a step S620.

If T is lower than or equal to T' at the step S620, the NOx amount thermally released from the DeNOx catalyst 40 is 0 at a step S650.

If T is higher than T' at the step S620, the control portion 50 subtracts the maximum NOx amount which can be stored at the current temperature of the DeNOx catalyst 40 from the currently stored NOx amount at a step S640, and calculates the mass flow of the NOx thermally released from the DeNOx catalyst 40 by dividing the value calculated at the step S640 by a predetermined time (generally, a time required for completely releasing the NOx). For example, if the current temperature of the DeNOx catalyst 40 is T2, the maximum NOx amount stored at the DeNOx catalyst 40 at T2 is A2. Therefore, d1 calculated by subtracting A2 from A1 is the NOx amount thermally released from the DeNOx catalyst 40, and the mass flow of the NOx thermally released from the DeNOx catalyst 40 is calculated by dividing d1 by the predetermined time.

After that, the control portion 50 calculates the mass flow of the NOx chemically released from the DeNOx catalyst 40 at a step S400. For this purpose, the control portion 50 calculates mass flow of NO2 released from the DeNOx catalyst 40 at a step S410, and calculates mass flow of the NO2 slipped from the DeNOx catalyst 40 at a step S420. Since the step S400 is disclosed in Korean Patent Application No. 10-2010-0121836, a detailed description thereof will be omitted. In addition, it is to be understood that the entire contents, such as specification, drawings, and claims of Korean Patent Application No. 10-2010-0121836 are included in this specification.

The control portion 50 calculates the mass flow of the NOx which is not purified and is exhausted to the atmosphere at a step S430. That is, the mass flow of the NOx which is exhausted to the atmosphere is calculated by below equation.

mass flow of NO*x* exhausted to the atmosphere=mass flow of NO*x* contained in exhaust gas−(mass flow of NO*x* stored at DeNO*x* catalyst−mass flow of NO*x* thermally released from DeNO*x* catalyst)+mass flow of NO*x* slipped from DeNOx catalyst In addition, the control portion 50 integrates values calculated by subtracting the mass flow of the NOx thermally released from the DeNOx catalyst 40 and the mass flow of the NOx chemically released from the DeNOx catalyst 40 from the mass flow of the NOx stored at the DeNOx catalyst 40 at a step S440. Thereby, the control portion 50 calculates the NOx amount actually stored at the DeNOx catalyst 40 at a step S450.

In addition, the control portion 50 integrates values calculated by subtracting the mass flow of the NOx thermally released from the DeNOx catalyst 40 and the mass flow of the NOx slipped from the DeNOx catalyst 40 from the mass flow of the NOx stored at the DeNOx catalyst 40 at a step S460. Thereby, the control portion 50 calculates difference of the NOx amount between the inlet and the outlet of the DeNOx catalyst 40 at a step S470.

As described above, since NOx amount stored at a DeNOx catalyst can be precisely predicted, purification efficiency of NOx may be improved according to the present invention.

Since regeneration timing and injection amount of reducing agents is controlled according to a precise NOx amount stored at the DeNOx catalyst, fuel economy may be improved.

In addition, since the precise NOx amount stored at the DeNOx catalyst can be predicted, overdesign of the DeNOx catalyst may be prevented and amount of a noble metal used in the DeNOx catalyst may be reduced.

For convenience in explanation and accurate definition in the appended claims, the terms upper, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for predicting NOx loading at a DeNOx catalyst, comprising:
   passing exhaust gas stream having the NOx, through the DeNOx catalyst;
   determining mass flow of NOx stored at the DeNOx catalyst by a control portion;
   determining mass flow of NOx thermally released from the DeNOx catalyst by the control portion;
   determining mass flow of NOx chemically released from the DeNOx catalyst by the control portion; and
   determining NOx amount actually stored at the DeNOx catalyst by using the mass flow of the NOx stored at the DeNOx catalyst, the mass flow of the NOx thermally released from the DeNOx catalyst, and the mass flow of the NOx chemically released from the DeNOx catalyst by the control portion; and
   injecting a fuel in the exhaust gas stream when the NOx amount actually stored at the DeNOx catalyst is larger than or equal to a predetermined value,
   wherein the determining of the mass flow of the NOx thermally released from the DeNOx catalyst and the determining of the mass flow of the NOx chemically released from the DeNOx catalyst are separately performed by the control portion.

2. The method of claim 1, wherein the determining of the mass flow of NOx stored at the DeNOx catalyst comprises:
   determining NOx storage capacity per volume according to catalyst temperature by the control portion;
   determining actual NOx storage capacity by using the NOx storage capacity per volume and effective volume of the DeNOx catalyst by the control portion;
   determining relative NOx storage level by using the actual NOx storage capacity and actual NOx storage amount by the control portion;
   determining a reference NOx storage efficiency by using the relative NOx storage level and the catalyst temperature by the control portion;
   correcting the reference NOx storage efficiency by the control portion; and
   determining the mass flow of NOx stored at the DeNOx catalyst by using the corrected NOx storage efficiency and mass flow of NOx in exhaust gas by the control portion.

3. The method of claim 2, wherein the reference NOx storage efficiency is primarily corrected based on volume speed of the exhaust gas and is secondarily corrected based on actual NO2/NOx ratio.

4. The method of claim 3, wherein primary correction of the reference NOx storage efficiency based on the volume speed of the exhaust gas comprises:
   determining a first correction coefficient based on the volume speed of the exhaust gas and catalyst aging; and
   multiplying the reference NOx storage efficiency and the first correction coefficient.

5. The method of claim 4, wherein the catalyst aging comprises thermal degradation and aging caused by sulfur poisoning.

6. The method of claim 3, wherein secondary correction of the reference NOx storage efficiency based on the actual NO2/NOx ratio comprises:
   determining a second correction coefficient based on the actual NO2/NOx ratio; and
   multiplying the primarily corrected reference NOx storage efficiency and the second correction coefficient.

7. The method of claim 1, wherein the determining of the mass flow of NOx thermally released from the DeNOx catalyst comprises:
   determining catalyst temperature at which current NOx storage amount is maximum NOx storage amount;
   determining whether current catalyst temperature is lower than or equal to the catalyst temperature at which the current NOx storage amount is the maximum NOx storage amount; and
   subtracting, in a case that the current catalyst temperature is higher than the catalyst temperature at which the current NOx storage amount is the maximum NOx storage amount, maximum NOx storage amount at the current catalyst temperature from the current NOx storage amount.

8. The method of claim 7, wherein the NOx is not thermally released from the DeNOx catalyst in a case that the current catalyst temperature is lower than or equal to the catalyst temperature at which the current NOx storage amount is the maximum NOx storage amount.

9. An exhaust system comprising:
   an exhaust pipe through which an exhaust gas is flowing, the exhaust gas being generated at an engine having a first injector injecting a fuel into a combustion chamber;
   a second injector mounted at the exhaust pipe and injecting a reducing agent;
   a DeNOx catalyst mounted at the exhaust pipe downstream of the second injector and reducing NOx contained in the exhaust gas by using the reducing agent injected by the second injector; and
   a control portion predicting NOx amount actually stored at the DeNOx catalyst according to a driving condition of the engine,
   wherein the control portion determines mass flow of NOx stored at the DeNOx catalyst, mass flow of NOx thermally released from the DeNOx catalyst, and mass flow of NOx chemically released from the DeNOx catalyst, and predicts the NOx amount actually stored in the DeNOx catalyst by subtracting the mass flow of NOx thermally released from the DeNOx catalyst and the mass flow of NOx chemically released from the DeNOx catalyst from the mass flow of NOx stored at the DeNOx catalyst,
   wherein the determining of the mass flow of NOx thermally released from the DeNOx catalyst and the determining of the mass flow of NOx chemically released from the DeNOx catalyst are separately performed by the control portion, and wherein the control portion injects an amount of the reducing agent in the exhaust gas by the second injector when the NOx amount actually stored at the DeNOx catalyst is larger than or equal to a predetermined value.

10. The exhaust system of claim 9, wherein the control portion determines NOx storage capacity by using NOx storage capacity per volume according to catalyst temperature and effective volume of the DeNOx catalyst, relative NOx storage level by using the NOx storage capacity and actual NOx storage amount, reference NOx storage efficiency by using the relative NOx storage level and the catalyst temperature, and the mass flow of NOx stored at the DeNOx catalyst by using the reference NOx storage efficiency and mass flow of NOx in the exhaust gas.

11. The exhaust system of claim 10, wherein the reference NOx storage efficiency is primarily corrected based on volume speed of the exhaust gas and catalyst aging.

12. The exhaust system of claim 11, wherein the reference NOx storage efficiency is secondarily corrected based on actual NO2/NOx ratio.

13. The exhaust system of claim 11, wherein the catalyst aging comprises thermal degradation and aging caused by sulfur poisoning.

14. The exhaust system of claim 9, wherein the control portion determines a maximum NOx amount which can be stored at current catalyst temperature and the mass flow of NOx thermally released from the DeNOx catalyst by subtracting the maximum NOx amount which can be stored at the current catalyst temperature from current NOx storage amount.

15. The exhaust system of claim 14, wherein the mass flow of NOx thermally released from the DeNOx catalyst, in a case that a value obtained by subtracting the maximum NOx amount which can be stored at the current catalyst temperature from the current NOx storage amount is positive, is determined by dividing the value by a predetermined time.

16. The exhaust system of claim 14, wherein the mass flow of NOx thermally released from the DeNOx catalyst, in a case that a value obtained by subtracting the NOx maximum amount which can be stored at the current catalyst temperature from the current NOx storage amount is negative, is zero.

17. The exhaust system of claim 9, wherein the reducing agent is fuel, and wherein the exhaust system further comprises a fuel cracking catalyst disposed at the exhaust pipe between the second injector and the DeNOx catalyst and decomposing the fuel.

18. A method for predicting NOx loading at a DeNOx catalyst, comprising:
passing exhaust gas stream having the NOx through the DeNOx catalyst;
determining, by a control portion, mass flow of NOx stored at the DeNOx catalyst;
releasing thermally mass flow of NOx from the DeNOx catalyst;
determining the mass flow of the NOx thermally released from the DeNOx catalyst by the control portion;
releasing chemically mass flow of NOx from the DeNOx catalyst;
determining the mass flow of the NOx chemically released from the DeNOx catalyst by the control portion;
determining, by the control portion, NOx amount actually stored at the DeNOx catalyst by using the mass flow of the NOx stored at the DeNOx catalyst, the mass flow of the NOx thermally released from the DeNOx catalyst, and the mass flow of the NOx chemically released from the DeNOx catalyst; and
injecting a fuel in the exhaust gas stream when the NOx amount actually stored at the DeNOx catalyst is larger than or equal to a predetermined value,
wherein the determining of the mass flow of the NOx thermally released from the DeNOx catalyst and the determining of the mass flow of the NOx chemically released from the DeNOx catalyst are separately performed by the control portion.

* * * * *